Nov. 21, 1933.   H. D. GEYER   1,935,794
METHOD FOR MOLDING PLASTIC MATERIAL
Filed April 29, 1929   3 Sheets-Sheet 2

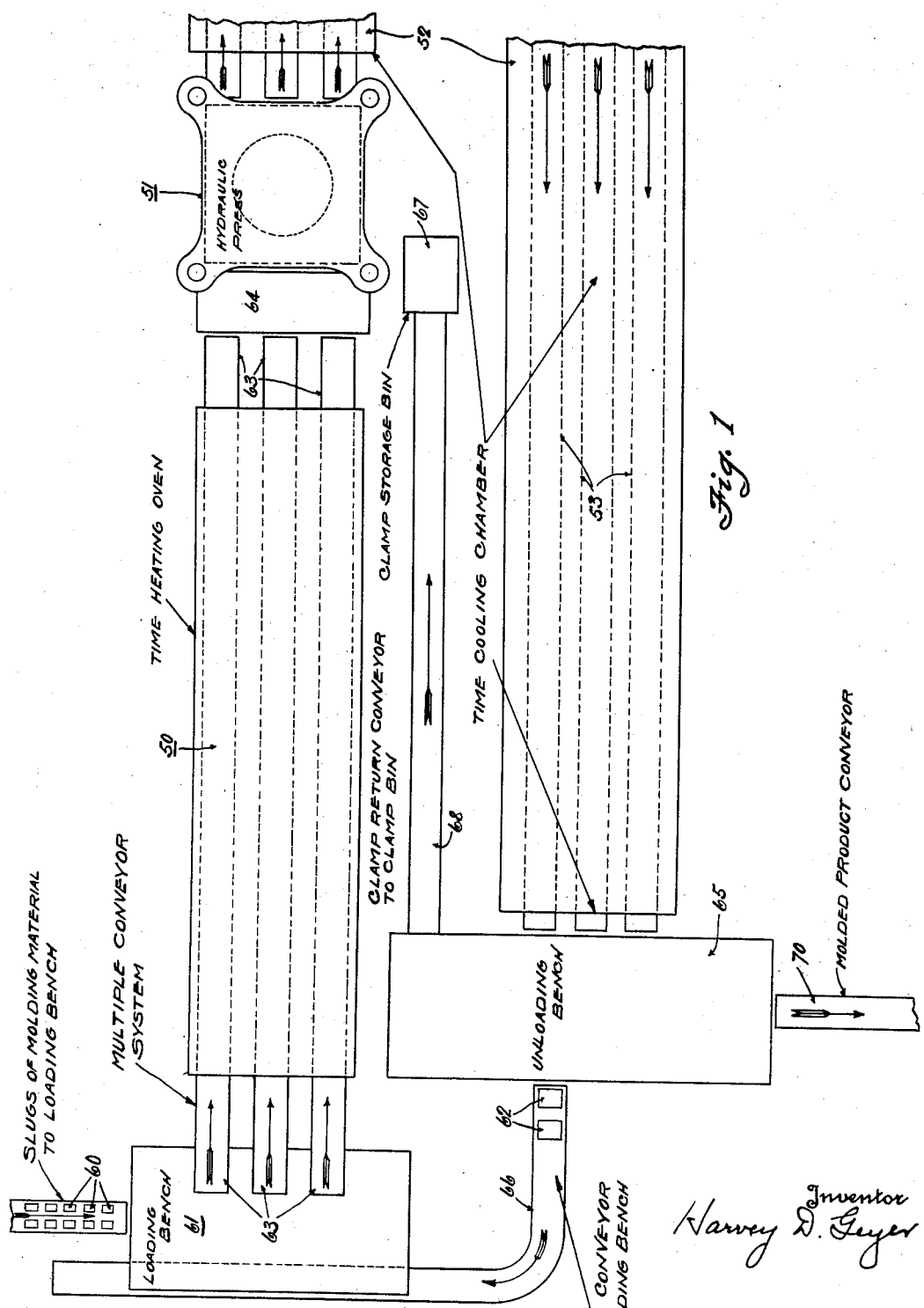

Inventor
Harvey D. Geyer
By Spencer Hardman & Fehr
His Attorneys

Nov. 21, 1933.   H. D. GEYER   1,935,794
METHOD FOR MOLDING PLASTIC MATERIAL
Filed April 29, 1929   3 Sheets-Sheet 3

Inventor
Harvey D. Geyer
By Spencer Hardman & Fehr
his Attorneys

Patented Nov. 21, 1933

1,935,794

UNITED STATES PATENT OFFICE 1,935,794

METHOD FOR MOLDING PLASTIC MATERIAL

Harvey D. Geyer, Dayton, Ohio, assignor to The Inland Manufacturing Company, Dayton, Ohio, a corporation of Delaware Application April 29, 1929. Serial No. 358,804

2 Claims. (Cl. 18—55)

This invention relates to improvements in the art of molding articles from a hot plastic material which sets and hardens by cooling rather than by any chemical action in the material itself, such for example as a hot plastic compound of gilsonite, a petroleum residue of lower melting point, a finely divided filler material, and a fibrous material.

In molding such bituminous compounds it is common to provide a divided molding die into which an unshaped piece of the hot plastic compound is inserted and thereafter the die parts are immediately forced closed by means of a hydraulic press in order to mold the material under high pressure. Since this material sets or hardens only by cooling, it is necessary to maintain this high molding pressure upon the material in the molds during a subsequent cooling period until the molded article sets sufficiently to permit and safely withstand removal from the mold without distortion of the molded article in any respect. Heretofore it has been common to maintain the pressure upon the mold during this cooling period by means of the hydraulic press itself, the cooling being done by circulating water through suitable passages in the platens of the press or in the mold parts where such mold parts are fixed to the press.

Now an object of this present invention is to provide a method and means for practicing same whereby the hydraulic press is needed only for the relatively short time required to force the divided mold parts together and put the hot plastic material under the desired high pressure, the mold parts being thereafter held closed by some other means to retain this high pressure during the cooling period after being removed from the hydraulic press. It is obvious that by this method the speed of production of molded articles from a single hydraulic press is greatly increased. For example, when the battery cell cover illustrated in the drawings of this application is molded by the ordinary method of holding the mold closed by the hydraulic press during the cooling period, each cycle of the press necessarily requires about five minutes, whereas by the method of this invention each cycle of the press requires not more than about ten seconds. In other words the press can be operated about thirty times as fast as it can by the ordinary method, which of course greatly reduces the cost of manufacture of the molded articles.

Another feature of the process of this invention is the method of heating the unshaped slugs of plastic compound together with the mold parts in a heating chamber. Several important advantages result from this. The entire series of molds are all heated to the same desired temperature and the temperature of each mold is uniform throughout its dimensions whereby any tendency for the molded article to stick to the mold at possible overheated areas is avoided. The unshaped slug of compound when heated to render it more plastic is heated to the same temperature as the mold, which also minimizes any tendency of the molded material to stick to the mold at the time of removal from the molds. The unshaped slug is inserted loosely in between the mold sections before it is heated and therefore it can be easily and correctly inserted by hand. Then while the mold sections with the unshaped slug inserted loosely therein are slowly passing through the heating chamber, the weight of the upper mold section being constantly supported by the slug while it is becoming more plastic due to the heat, the slug of material quite materially conforms in shape to the mold cavity, thus permitting the mold sections to be partially closed prior to reaching the hydraulic press. This causes a better and quicker filling of the mold cavity and also permits a shorter stroke for the hydraulic press, thus permitting a more rapid operation of the press.

Another feature of the process of this invention is the simultaneous heating of a series of molds together with their contents of moldable material, whereby any one mold may be brought up to the desired temperature at such slow rate as is found to be the best without limiting the speed of operation of the hydraulic press.

Another feature is the simultaneous cooling of a series of molds as they pass through the cooling chamber, whereby each mold may be cooled at whatever rate and to whatever temperature is found to be the best without limiting the number of molded articles produced by the apparatus per unit of time.

Further objects and advantages of the present invention will be apparent from the following description, reference being had to the accompanying drawings, wherein a preferred embodiment of one form of the present invention is clearly shown.

In the drawings:

Fig. 1 is a diagrammatic drawing of the apparatus for carrying out the method of this invention.

Figure 3:
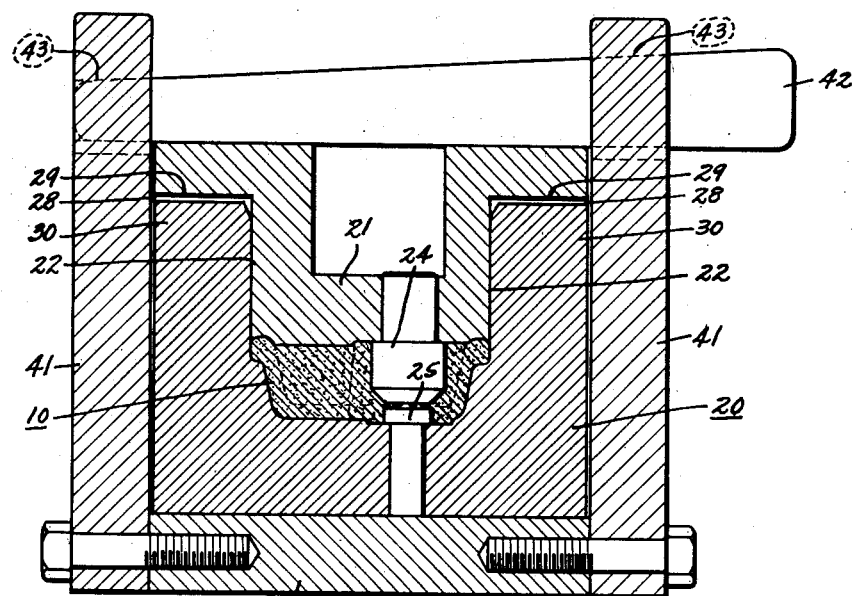
Fig. 3 is a transverse section along the line 3—3 of Fig. 2 and shows the mold sections tightly forced together upon the contained molded cell cover by means of the mold clamp.
Figure 2:
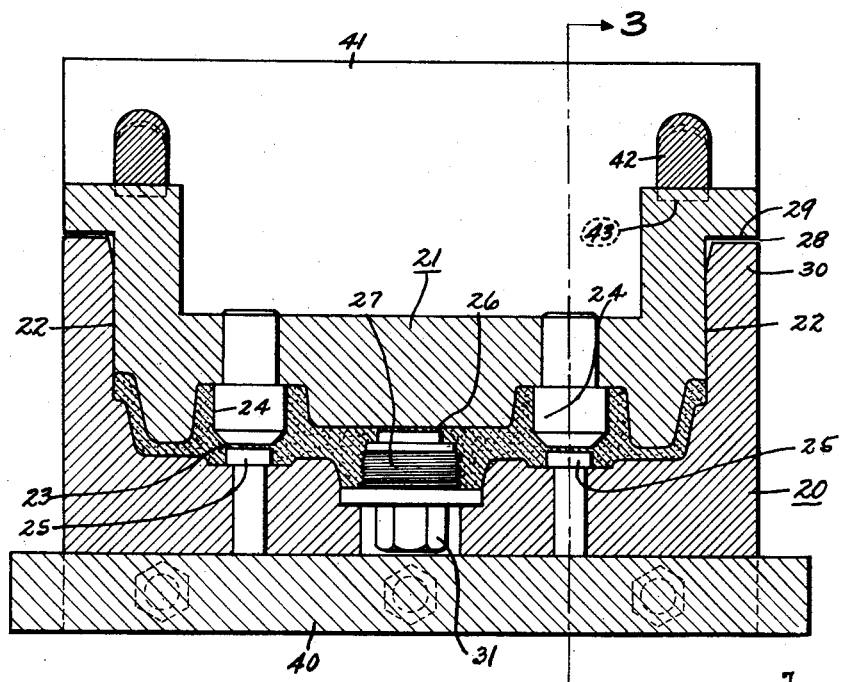
Fig. 2 is a section through the divided mold with a molded battery cell cover in place therein and shows the mold sections held tightly clamped together by a mold clamp. The section is taken along a line corresponding to line 5—5 of Fig. 4.
Figure 4:
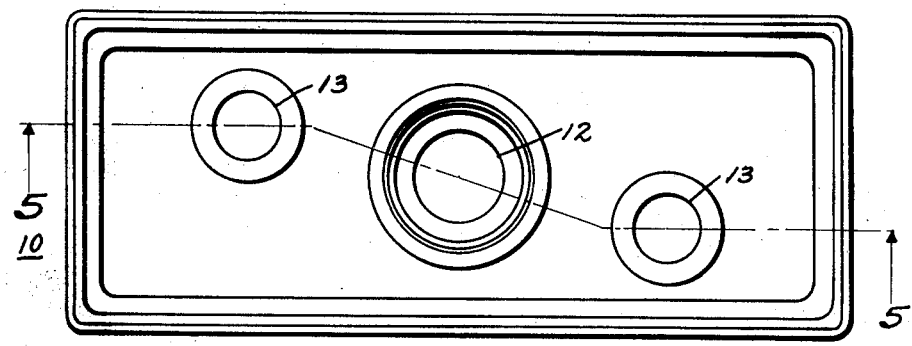
Figure 5:
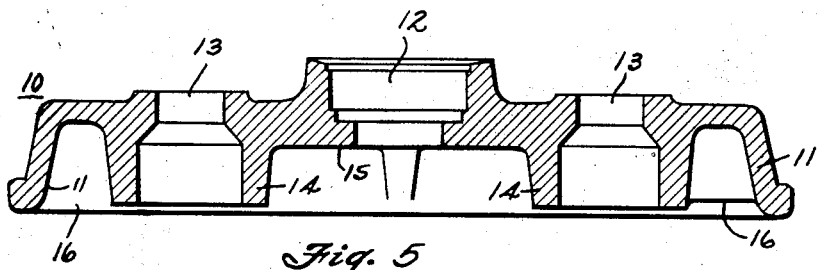
Figure 6:
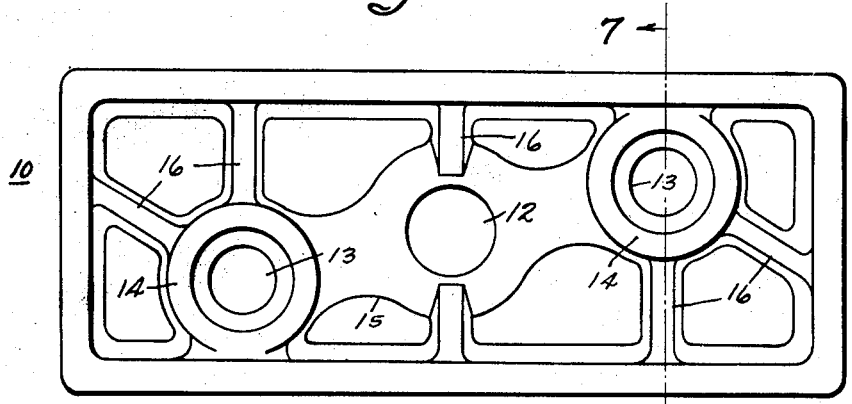
Figure 7:
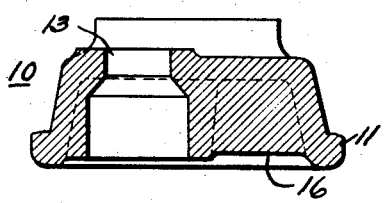

Figs. 4, 5, 6 and 7 are detail views of the battery cell cover which is molded by the molds shown in Figs. 2 and 3. Fig. 4 is a top view of the cover, Fig. 5 is a section taken on the line 5—5 of Fig. 4, Fig. 6 is a bottom view, and Fig. 7 is a transverse section taken on the line 7—7 of Fig. 6.

Similar reference characters refer to similar parts throughout the several views.

Figs. 4 to 7 inclusive clearly show the structure of a storage battery cell cover 10 which, for illustrative purposes, has been chosen as the molded article produced by the method and apparatus of this invention. Each cell cover has a downwardly turned peripheral flange 11 a central filler opening 12 adapted to be closed by a filler plug (not shown), and two openings 13 through which the terminal posts of the battery plates are adapted to project in a manner well known. Each opening 13 has a depending circular flange 14 having a greater inner diameter than the openings 13, which flanges 14 are adapted to receive soft rubber or other suitable bushings slipped upon the terminal posts. 15 indicates a wide thickened portion on the under side and extending diagonally to surround the three above described openings. 16 indicates various other strengthening webs added to give greater rigidity and strength to the cover.

Figs. 2 and 3 show sections through a divided mold for molding the above described cell cover from a hot plastic bituminous compound such as mentioned hereinabove. The female or lower mold section 20 receives the male or upper mold section 21 with a telescoping sliding fit along the surfaces 22. An unshaped piece of plastic material is inserted within the lower section 20 and the upper section 21 is set in place with its weight resting upon the plastic material within the mold cavity.

The mold and plastic material, thus loosely assembled, are passed slowly through the heating oven 50 (see Fig. 1) and thus both sections of the mold and its contents of plastic material are evenly raised to the desired temperature whereby to give the material the desired plasticity and molding qualities.

The loosely assembled hot mold and contents then passes to the hydraulic press, indicated at 51, and there the press 51 is operated to force the mold sections 20 and 21 together with a very great force, thereby molding the plastic material to the shape of the mold cavity (as shown in Figs. 2 and 3) under a high internal pressure within the material itself. In order to mold the plastic material under high internal pressure it is necessary that there be a clearance between all parts of the lower and upper sections respectively after the mold cavity is completely filled. For this reason there is a small clearance 23 between the cores 24 slidably mounted in the upper section 21 and the headed pins 25, preferably fixed to the lower section 20 (see Fig. 2). Likewise there is a small clearance 26 between the bottom of the section 21 and the core plug 27. Likewise there is a clearance 28 between the shoulders 29 on the upper section 21 and the sides 30 of the lower section 20.

Prior to placing the loosely assembled mold under the ram of the hydraulic press 51, the mold is slid loosely within a clamping unit 40 having sides 41 extending up above the top of the section 21, and the mold and clamping unit 40 are both set under the hydraulic ram. The ram, however, is so dimensioned that it projects down between the sides 41 of the unit 40 and so forces the mold sections 20 and 21 together as described above. Now while the hydraulic ram holds the mold sections forced together with a great force, the two tapered pins 42 are driven tightly into slots 43 provided therefor in the sides 41. The top edge of pins 42 bears against the top of the slots 43, while the bottom edge of these pins bears against the top of mold section 21, as clearly shown in Figs. 2 and 3, and hence the mold sections are held tightly clamped together by this clamping unit 40. Therefore as soon as pins 42 are driven in place the hydraulic ram may be raised and the mold while still held clamped by unit 40 removed from the press 51 and passed through the cooling chamber 52 where the molded material sets by cooling while still held under high pressure. The steps in the method of this invention of originally applying the molding pressure by a press and maintaining this high pressure upon the molded material during a subsequent cooling period by some other means after release of the press constitutes an important feature. It is obvious that with this method the cycle of operation of the press may be very short compared to the cooling period necessary for the molded material to set sufficiently to permit release of the molding pressure. It is to be understood that the invention is not limited to any particular kind of clamping means for maintaining the molding pressure after release of the press, since it is obvious that many types of quickly applied clamping means will be suitable, such, for instance, as an automatically operated latch mechanism between the mold sections 20 and 21 for holding them clamped together at their closed position.

After the molds and the molded articles therein are sufficiently cooled in chamber 52 to the desired temperature, the molded cell covers are removed from the molds. The pins 42 are first knocked out, thus permitting separation of the mold sections 20 and 21. When the sections are separated the molded cell cover 10 will come out with the top section 21 due to its shrinkage upon the larger projecting parts of section 21. The screw-threaded core plug 27 comes out with the cover 10 and locked thereto by the molded threads in the cover 10. This plug 27 is removed from cover 10 by applying a wrench to its hexagon head 31 and unscrewing it from the molded threads in the material. The cover 10 may be forced from the mold section 21 by means of the core plugs 24 whose shanks have a sliding fit in apertures in section 21, as will be clearly understood from viewing Fig. 2. The relatively thin webs of molded material which occupied the clearance spaces 23 and 26 is easily punched from the molded cover, thus providing the holes 13 and 12 as shown in Fig. 5.

Fig. 1 illustrates in a diagrammatic way the apparatus and the sequence of steps used in molding battery cell covers as described above. Unshaped pieces or "slugs" of plastic bituminous moldable material of substantially equal predetermined weight are shown at 60 passing on a conveyor to a loading bench 61. Empty mold sections are shown at 62 also passing to the loading bench 61. An operator standing at the loading bench inserts one of the slugs 60 into each female mold section 20 and places the male section 21 thereupon, and starts the thus loosely assembled molds through the heating oven 50 on the conveyors 63. When the molds emerge at the press table 64 they have been heated uniformly to the desired temperature to render the plastic material therein in proper condition for molding under pressure. An operator at table 64 slides each mold within a clamping unit 40 and then slides both the mold and clamp under the ram of the hydraulic press 51. The ram is immediately caused to force the mold sections together to mold the plastic material under the desired high pressure and while the ram pressure is on, operators drive in the two tapered pins 42, as described hereinabove, thus retaining the mold sections clamped together, whereupon the hydraulic ram is raised. The mold, held clamped as shown in Figs. 2 and 3, now passes from the press 51 to the cooling chamber 52, and the press 51 is then immediately ready for the next mold closing operation. The molds pass slowly through the cooling chamber 52 on suitable conveyors 53 and are cooled by some suitable means, preferably a water spray extending along the path of movement of the molds. In the Fig. 1 of the drawings chamber 52 is shown broken away at the right, it being understood that there is a return bend in chamber 52 which is not shown. The molds pass from chamber 52 to the unloading bench 65 where operators remove the clamps 40 and separate the mold sections as described hereinabove. The empty mold sections 62 are conveyed back to the loading bench 61 by conveyor 66. The clamping units 40 are conveyed by conveyor 68 to the storage bin 67 located in convenient position near the table 64. The completely molded cell covers 10 are conveyed away from unloading bench 65 by conveyor 70. It will now be clear that this apparatus provides for a continuous operation. The heating up of the molds and contents prior to entering the hydraulic press is carried on simultaneously with the cooling of the molds which have been forced closed by the press 51 as they pass therethrough. The press of course can be operated in rapid cycles since it is not required to maintain the pressure upon the molded material during the cooling period, as explained above.

While the form of embodiment of the present invention as herein disclosed, constitutes a preferred form, it is to be understood that other forms might be adopted, all coming within the scope of the claims which follow.

What is claimed is as follows:

1. The steps in the method of molding articles from a purely thermo-plastic bituminous material comprising: inserting pieces of said material loosely within each of a series of divided molds, heating a plurality of the molds and the material therein together to the same uniform temperature throughout, then successively forcing the molds closed with a momentarily applied forcing means to complete the molding of the plastic material therein under high internal pressure, retaining each successive mold closed by retaining means independent of the mold-closing means but without release of the high internal pressure on the material therein, successively removing the closed molds from the mold-closing means and then simultaneously cooling a plurality of said molds to permit the molded articles to set.

2. The method of molding articles from a thermo-plastic material comprising: inserting roughly shaped pieces of said material within each of a series of divided molds, simultaneously heating a plurality of the molds and material together to the same uniform temperature throughout, then successively forcing the divided molds closed to complete the molding of the heated plastic material under high internal pressure, successively clamping the molds closed without release of the high internal pressure on the material therein and successively removing same from the mold closing means, simultaneously cooling a plurality of molds and contents for a period of time, and then removing the molded articles therefrom.

HARVEY D. GEYER.